US010619305B2

United States Patent
Bouxin et al.

(10) Patent No.: US 10,619,305 B2
(45) Date of Patent: Apr. 14, 2020

(54) COATING SLIPS FOR PAPER AND CARDBOARD CONTAINING A DEXTRIN WITH A HIGH AMYLOPECTIN CONTENT

(71) Applicant: ROQUETTE FRERES, Lestrem (FR)

(72) Inventors: Christian Bouxin, Marquillies (FR); Ludivine Onic, Beuvry (FR); Timo Pajari, Espoo (FI)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/407,107

(22) PCT Filed: Jul. 5, 2013

(86) PCT No.: PCT/FR2013/051604
§ 371 (c)(1),
(2) Date: Dec. 11, 2014

(87) PCT Pub. No.: WO2014/006346
PCT Pub. Date: Jan. 9, 2014

(65) Prior Publication Data
US 2015/0132594 A1    May 14, 2015

(30) Foreign Application Priority Data
Jul. 6, 2012  (FR) ..................... 12 56542

(51) Int. Cl.
| | |
|---|---|
| *D21H 19/12* | (2006.01) |
| *D21H 19/54* | (2006.01) |
| *D21H 17/28* | (2006.01) |
| *C09D 103/02* | (2006.01) |
| *C09J 103/02* | (2006.01) |
| *C09J 125/10* | (2006.01) |
| *C08L 3/12* | (2006.01) |
| *C08K 3/34* | (2006.01) |
| *C08K 3/26* | (2006.01) |

(52) U.S. Cl.
CPC ............. *D21H 19/12* (2013.01); *C08K 3/346* (2013.01); *C08L 3/12* (2013.01); *C09D 103/02* (2013.01); *C09J 103/02* (2013.01); *C09J 125/10* (2013.01); *D21H 17/28* (2013.01); *D21H 19/54* (2013.01); *C08K 2003/265* (2013.01); *Y10T 428/31982* (2015.04)

(58) Field of Classification Search
None
See application file for complete search history.

(56) References Cited

U.S. PATENT DOCUMENTS

| | | | |
|---|---|---|---|
| 6,613,152 B1 * | 9/2003 | Maas et al. ..................... | 127/38 |
| 2007/0289486 A1 * | 12/2007 | Apostol ................ | C09D 11/08 |
| | | | 106/31.39 |
| 2008/0027174 A1 * | 1/2008 | Kawamura .......... | C09D 151/02 |
| | | | 525/54.26 |
| 2010/0159263 A1 * | 6/2010 | Ahlgren ................ | D21H 19/58 |
| | | | 428/514 |

FOREIGN PATENT DOCUMENTS

| | | |
|---|---|---|
| EP | 1281721 A1 | 2/2003 |
| JP | 2004008147 A | 1/2004 |
| JP | 2009131184 A | 6/2009 |
| WO | 9964467 A1 | 12/1999 |
| WO | WO 9964467 A1 * | 12/1999 |
| WO | 2005003456 A1 | 1/2005 |
| WO | 2005047385 A1 | 5/2005 |

OTHER PUBLICATIONS

International Search Report, dated Sep. 2, 2013, from corresponding PCT application.

* cited by examiner

*Primary Examiner* — Chinessa T. Golden

(57) ABSTRACT

Coating colors having a dextrin having high amylopectin content. When such a dextrin is used in the form of an adhesive, it confers an excellent stability on the adhesive. When the adhesive is subsequently incorporated in the coating color, it makes it possible to adjust the Brookfield viscosity thereof, while providing a good compromise between water retention and rheological behavior at high shear gradient. Also, the use of such dextrin for the manufacture of a coating color. Further, a process for the manufacture of a paper or of a cardboard coated on at least one its face with a coating color, and papers and cardboards thus obtained.

12 Claims, No Drawings

COATING SLIPS FOR PAPER AND CARDBOARD CONTAINING A DEXTRIN WITH A HIGH AMYLOPECTIN CONTENT

The present invention relates to novel coating colors comprising a dextrin having a high amylopectin content. Advantageously, when this dextrin is employed in the adhesive form, it confers an excellent stability on said adhesive. When the adhesive is subsequently incorporated in the coating color, it makes it possible to adjust the Brookfield viscosity thereof, while providing a good compromise between water retention and rheological behavior at high shear gradient.

The present invention thus relates to a coating color comprising, in a certain proportion, a dextrin rich in amylopectin. It also relates to the use of this dextrin to manufacture said coating color. It is also targeted at a process for the manufacture of a paper or cardboard coated on at least one of its faces with a coating color according to the invention. Finally, it encompasses the papers and cardboards thus obtained.

In the context of the manufacture of a sheet of paper or of a cardboard by coating, a coating operation is carried out which consists in depositing, at the surface of the support, a complex formulation denoted "coating color". The latter comprises water, at least one pigment or one inorganic filler, at least one natural or synthetic binder, and also various other additives chosen in particular from a dispersant, a rheology modifier, an optical brightener, an antifoaming agent, and the like.

The binder, as its name indicates, has the main role of ensuring the cohesion of the various ingredients within the coating color. Historically, products of synthetic origin, such as acrylic latexes or latexes of styrene/butadiene type, have been employed. Recently, attempts have been made to replace these products, resulting from petrochemicals, with solutions of vegetable origin.

In the light of the contents of binder employed in coating colors (which can reach 25% of the total weight of the dry matter), it is understood that this problem of replacing the synthetic latexes has become a major challenge for the paper industry.

The state of the art is extremely rich in solutions of natural origin, in particular based on starch or its derivatives, which make it possible to at least partially replace the synthetic latex initially present in the coating color. It is appropriate, above all, to examine the technical specifications which govern the validation of a replacement solution of natural origin.

Among the constraints imposed on a person skilled in the art, the main is without doubt that of the stability of the product in the adhesive form, namely starch or its derivatives suspended in water at a solids content generally between 25% and 45% by weight. This stability can be grasped visually but also more exactly through a measurement of viscoelasticity (determination of the elastic and viscous moduli) or also by measurement of the Brookfield viscosity, according to the methods well known to a person skilled in the art. It is the latter method which is favored in the present patent application.

Conventionally, the experiment consists in heating a starch suspension in order to obtain an adhesive and in then measuring its Brookfield viscosity as it cools: an increase in the viscosity due to the decrease in the temperature is then observed. A sudden or strong increase in the viscosity (or "drop-off", if the curve relative to the viscosity as a function of the temperature is considered) is characteristic of the "retrogradation" of the starch. This phenomenon denotes the tendency which amylose macromolecules have to reassociate with one another during the cooling of the adhesive by formation of hydrogen bonds.

More particularly, it is important not to get such a retrogradation at a temperature of the order of 60° C., which corresponds to the temperature at which the adhesive is incorporated in the coating color. In the present patent application, an adhesive will be referred to as "stable" or dextrin will be referred to as conferring a "stable" behavior on the adhesive in which it is used when a sudden or strong change in the Brookfield viscosity is not observed during the cooling of said adhesive.

Once the coating color has been produced, that is to say after mixing between the natural and synthetic binders, the filler and the pigment, the water and the other additives, new technical constraints appear which are related to the use of said coating color.

Mention may be made, among them, of the ability of the coating color to be easily transported, transferred and handled, which operations are entirely standard in a paper production unit. It may be admitted that a Brookfield viscosity value (at 25° C. and 100 revolutions per minute) of between approximately 500 mPa·s and 1500 mPa·s corresponds to a rheology compatible with the requirements for handling the coating color. This viscosity value can, if appropriate, be adjusted by means of thickening agents.

Subsequently, the coating color is intended to be applied to the surface of the paper or cardboard. At the time of the application, in particular during a coating where the thickness of coating color deposited is controlled by a blade, the coating color is subjected to very high shear stresses. The higher the resulting viscosity, the greater the pressure to be exerted on the blade has to be; excessively high pressures cause overflows of coating colors known under the terms of "filaments" or of "beads". Conversely, if a reduction in this blade pressure is achieved, the speed of the paper coating can advantageously be increased and an improved yield can advantageously result.

It is in particular through a viscosity measurement referred to as ACAV that it is possible to appreciate the rheology of the coating color at high shear gradient. The lowest possible viscosity is thus targeted here.

Finally, after deposition, the coating color exhibits a natural tendency to transfer, into the paper sheet, all or a portion of the water and hydrosoluble parts present in it. It is necessary to control an excessively rapid migration which would harm the physical and optical characteristics of the layer deposited. The aim is thus to retain the water in the coating color: reference will be made to water retention. The latter can be determined through the "Gradek" method well known to the person skilled in the art; the lower the value obtained, the better the water retention.

In point of fact, looking for natural solutions for the purpose of at least partially replacing synthetic latexes in coating colors, the Applicant has succeeded in developing novel compositions, one of the specific features of which is based on the presence of dextrins exhibiting a high amylopectin content.

Surprisingly, the adhesives formulated with the dextrins according to the present invention which have high weight-average molecular weights (greater than 600,000 Da) exhibit a stability at least as great as the adhesives produced with commercial starches with lower molecular weights, and an improved stability with respect to adhesives formulated with dextrins with lower molecular weights.

In addition, it is shown that the coating colors according to the present invention offer a better compromise between stability, behavior under high shearing and water retention than the solutions of the prior art. According to a preferred alternative of the invention corresponding to a selection with regard to the molecular weights, this compromise can be optimized so as to very greatly exceed the performance levels of the prior art.

Dextrin within the meaning of the present invention is understood to mean a starch modified in the dry phase by the action of heat, the use of a chemical reagent, the action of ionizing radiation and the combinations of these different means. In other words, the dextrins within the meaning of the present invention are obtained from native starch and are not subjected to any other modification, in particular chemical modification, other than the dextrinization reaction. It is thus also possible to speak of unmodified dextrins. These products are well known and widely described in the literature. Their use in a coating color has already been the object of a certain number of patent applications.

Patent application EP 1 281 721 reports dextrins resulting from the heat treatment of starch and mentions their use in the field of paper, more particularly as sizing agent, but without any associated technical problem.

International patent application WO 2005/047385 describes compositions based on two chemically, physically or enzymatically modified starches and their use in the coating of paper. It is indicated that these starches can be dextrins but no information is then given on the nature and the properties of the latter.

The Applicant has itself described, in international patent application WO 2005/003456, compositions based on modified starch which are used for the adhesive bonding and the coating of paper and cardboard. The rheology of the coating colors and the water retention are improved by the use of such compositions. While this document does not mention the term dextrin, it clearly indicates a selection with regard to the amylose content, the latter having to be between 20% and 60%.

Finally, the Applicant indicates that it has also described, in French patent applications 11 54539 and 12 54540, not yet published at the date of filing of the present application, dextrins with high molecular weights which exhibit a high polydispersity index, and also their use for the coating of paper. No reference is made to the amylopectin content of these products.

In addition, the Applicant specifies that dextrins having a high amylopectin content (and employed in the present patent application) are well known as such, in particular in food applications. Reference may be made, for example, to the documents JP2009-131184 and JP2004-008147. A person skilled in the art thus does not encounter any particular problem with regard to the manufacture of these products.

Consequently, a first subject matter of the present invention lies in a coating color for paper or cardboard, comprising water, at least one inorganic or organic material and a binder composed of at least one dextrin, characterized in that it exhibits an amylopectin content of greater than 95%.

In a way well known to a person skilled in the art, the amylopectin content is determined by potentiometry of the iodine absorbed by the amylose so as to form a complex.

The coating color according to the invention is also characterized in that it comprises, expressed as % by weight of each of its constituents with respect to its total weight:
from 20% to 50%, preferably from 28% to 50%, of water,
from 50% to 75%, preferably from 50% to 64%, of at least one inorganic or organic material,
from 5% to 20%, preferably from 8% to 12%, of a binder composed of at least one dextrin exhibiting an amylopectin content of greater than 95%,
from 0% to 5%, preferably from 0.1% to 2%, of at least one additive chosen from an optical brightener, a rheology modifier, a thickener, an antifoaming agent, a dispersant, a pH-regulating agent, a colorant, a lubricant or a crosslinking agent.

The coating color according to the invention is also characterized in that the binder is composed of at least 20%, preferably at least 80%, very preferably of at least 99%, by dry weight of a dextrin exhibiting an amylopectin content of greater than 95%.

Preferably, this coating color is also characterized in that said dextrin exhibits an amylopectin content of greater than 98%, preferably of greater than 99%.

This coating color is also characterized in that said dextrin exhibits a weight-average molecular weight of greater than 600,000 Da, preferably 1,000,000 Da, and in all cases less than 2,500,000 Da. The alternative form where the weight-average molecular weight is between 1,000,000 Da and 2,500,000 Da corresponds to the very preferred alternative form of the invention.

These weight-average molecular weights are conventionally measured by size exclusion chromatography techniques of HPSEC-MALLS (High Performance Size Exclusion Chromatography coupled on-line with Multiple Angle Laser Light Scaterring) type. The corresponding measurement protocol is shown in the introductory part of the examples supporting the present application.

The dextrin is preferably prepared from native starch by heat treatment in the dry phase under acid catalysis.

Another subject matter of the present invention consists of the use as binder, for the preparation of a coating color for paper or cardboard, of at least one dextrin characterized in that it exhibits an amylopectin content of greater than 95%.

This use is also characterized in that the binder is composed of at least 20%, preferably of at least 80%, very preferably of at least 99%, by dry weight of at least one dextrin exhibiting an amylopectin content of greater than 95%.

This use is also characterized in that said dextrin exhibits an amylopectin content of greater than 98%, preferably of greater than 99%.

In a preferred alternative form, this use is characterized in that said dextrin exhibits a weight-average molecular weight of greater than 600,000 Da, preferably 1,000,000 Da, and in all cases less than 2,500,000 Da.

Another subject matter of the present invention consists of a process for coating a paper or a cardboard by application, to at least one of the faces of said cardboard or said paper, of a coating color according to the invention.

A final subject matter of the present invention consists of a paper or a cardboard, at least one of the faces of which has been coated using a coating color according to the present invention.

The examples which follow make it possible to better appreciate the present invention, without, however, limiting the scope thereof.

EXAMPLES

In all the tests which follow, the molecular weights of the starches and dextrins are determined by size exclusion chromatography, according to the following protocol:
preparation of a sample by dissolution of the product, by heating at 100° C. for 30 min, in a dilution solvent composed of a DMSO/NaNO$_3$ mixture (0.1M NaNO3 in DMSO), it being possible for said sample to exhibit a concentration ranging from 2 to 10 mg of product per ml of dilution solvent;

use of a high performance liquid chromatography (HPLC) device equipped with a pump, operating in isocratic mode, causing an elution solvent to circulate at 0.3 ml/min, with a refractometer, with an 18-angle laser multiple angle light scattering detector heated to 35° C., for example a Dawn DSP detector from Wyatt, and with an oven for thermostatic control of the columns heated to 35° C., for example equipped with polyhydroxymethacrylate columns of SUPREMA type and for which the elution solvent is, for example, a 0.1M aqueous sodium nitrate solution comprising 0.02% by weight of sodium azide;

injection into the device of a sample volume of approximately 100 µl;

the weight-average and number-average molecular weights can be determined from the spectra obtained, for example by reprocessing the spectra in $1^{st}$ order exponential using the analytical software of Astra v.4 type.

Example 1

This example relates to the preparation of adhesives comprising a starch according to the prior art, a dextrin not complying with the invention and dextrin according to the invention. In this instance, the adhesives were produced in a jet cooker which makes it possible to cook the starch at 140° C. for 1 minute 30 seconds.

The first is an oxidized starch with a weight-average molecular weight of the order of 360,000 Da sold by Avebe™ under the name Perfectamyl™ A2177 (product No. 1). Its amylopectin content is equal to 22%.

The second is a dextrin with a weight-average molecular weight of the order of 1,000,000 Da sold by Roquette™ under the name Stabilys™ A020 (product No. 2). Its amylopectin content is equal to 24%.

The third is a dextrin with a weight-average molecular weight of the order of 270,000 Da sold by Roquette™ under the name Stabilys™ A025 (product No. 3). Its amylopectin content is equal to 24%.

The fourth is a dextrin with a weight-average molecular weight of the order of 1,500,000 Da (product No. 4). Its amylopectin content is 99.5%.

Two adhesives having a variable solids content (SC) of starch or dextrin (SC=27%, 35%) were prepared, the Brookfield viscosities of which were measured at 100 revolutions per minute and at different temperatures, the latter being decreased. The results appear in tables 1 and 2. It is found that the dextrin according to the invention (product No. 4) confers a much better stability on the adhesive than the dextrin according to the prior art (product No. 2) and exhibiting a comparable weight-average molecular weight. Furthermore and entirely surprisingly, this stability is comparable to that obtained with the oxidized starch of low molecular weight (product No. 1) and to that obtained with the dextrin of the prior art also having a low molecular weight (product No. 3).

TABLE 1

| | SC = 35% | | | |
|---|---|---|---|---|
| | Product No. 1 | Product No. 2 | Product No. 3 | Product No. 4 |
| 80° C. | 140 | 180 | 120 | 180 |
| 70° C. | 160 | 250 | 150 | 220 |
| 60° C. | 200 | 430 | 180 | 270 |
| 50° C. | 250 | 6500 | 220 | 360 |
| 40° C. | 380 | * | 340 | 550 |
| 30° C. | 630 | * | 600 | 800 |

* not measurable

TABLE 2

| | SC = 27% | | | |
|---|---|---|---|---|
| | Product No. 1 | Product No. 2 | Product No. 3 | Product No. 4 |
| 70° C. | 90 | 170 | 70 | 110 |
| 60° C. | 100 | 290 | 80 | 125 |
| 50° C. | 125 | 900 | 110 | 150 |
| 40° C. | 150 | 5000 | 140 | 180 |
| 30° C. | 200 | 10 000 | 160 | 240 |

Example 2

This example relates to the preparation of coating colors according to the prior art with use of the product Perfectamyl™ A2077 (product No. 1) and according to the invention with two dextrins which are the product No. 4 already used in the preceding example and the product No. 5, with weight-average molecular weights respectively equal to 1,500,000 Da and 700,000 Da, the amylopectin contents of which are 99.5%.

Each coating color is composed of:
80 parts by weight of Nugloss™ (pigment);
20 parts by weight of Hydrocarb™ 60 (calcium carbonate);
12 parts by weight of nonsynthetic binder according to the prior art or according to the invention;
12 parts by weight of a synthetic latex of styrene/butadiene type sold by BASF™ under the name Styronal™ 302 S.

The solids content of these coating colors is fixed at 61% and their pH is adjusted to 8.5.

The coating colors A, B and C respectively comprise the products 1, 4 and 5.

The amylaceous binder is introduced in the form of an adhesive. The adhesive is in this instance manufactured in an open vessel having a hollow tube, so as to cook the starch at approximately 96° C. for 30 minutes.

For each coating color, the following were determined at 25° C.:
its Brookfield viscosity at 100 revolutions per minute;
its water retention according to the "Gradek" method;
its ACAV viscosity at 1,000,000 $s^{-1}$.
The results appear in table 3.

TABLE 3

| | Coating color A | Coating color B | Coating color C |
|---|---|---|---|
| Brookfield viscosity | 1450 | 950 | 520 |

TABLE 3-continued

|  | Coating color A | Coating color B | Coating color C |
|---|---|---|---|
| (mPa · s) | | | |
| Water retention Gradek (g/m2) | 69 | 44 | 68 |
| ACAV viscosity at 1 000 000 s$^{-1}$ (mPa · s) | 61 | 55 | 54 |

It is found that the 2 coating colors according to the invention exhibit Brookfield viscosity values which are entirely acceptable, even if they are lower than that obtained for the reference; furthermore, the formulator will know how to adjust these viscosities, in particular by addition of a targeted thickening agent. Entirely advantageously, the viscosity at high shear gradient is decreased in the case of the invention, which allows a reduction in the blade pressure or an increase in the coating rate. Finally, particularly advantageously, the coating color B, which corresponds to the preferred alternative form of the invention (weight-average molecular weight of between 1,000,000 Da and 2,500,000 Da), exhibits a much lower water retention than the reference coating color. Thus, in this case, a particularly advantageous compromise in properties has been achieved.

Example 3

In this example, a novel coating color formulation is prepared by the use of 4 products:
the product No. 6 according to the prior art, which is an oxidized potato starch with a weight-average molecular weight equal to approximately 520,000 Da and having an amylopectin content equal to 22%;
the product No. 3 already described (Stabilys™ A025) and representing the prior art;
the product No. 7 representing the prior art and sold by Roquette™ under the name Stabilys™ A035, with a weight-average molecular weight equal to 120,000 Da and having an amylopectin content equal to 26%;
and a product according to the invention (product No. 8) which is a dextrin with a weight-average molecular weight equal to approximately 1,100,000 Da and having an amylopectin content of 99.5%.
Each coating color is composed of:
100 parts by weight of Hydrocarb™ 60 (calcium carbonate),
5.5 parts by weight of a styrene/butadiene latex according to the prior art which is sold by Polymerlatex™,
6 parts by weight of nonsynthetic binder according to the prior art or the invention,
0.2 part by weight of carboxymethyl cellulose,
0.1 part by weight of a thickener sold by BASF™ under the name Sterocoll™ SL.
The solids content of these coating colors is fixed at 68% and their pH is adjusted to 9.
The coating colors D, E, F and G respectively comprise the products 6, 3, 7 and 8.
For each color, the following were determined at 25° C.:
its Brookfield viscosity at 100 revolutions per minute,
its water retention according to the "Gradek" method,
its ACAV viscosity at 1,000,000 s$^{-1}$.
The results appear in table 6.
As for example 2, it is confirmed that the coating color according to the invention (coating color G) is that which results in the best compromise between a reduced ACAV viscosity and an improved water retention, it being possible for the Brookfield viscosity to be adjusted by the formulator by means of thickeners well known to him.

TABLE 4

|  | Coating color D | Coating color E | Coating color F | Coating color G |
|---|---|---|---|---|
| Brookfield viscosity (mPa · s) | 1750 | 1750 | 1300 | 1300 |
| Water retention Gradek (g/m2) | 25 | 35 | 51 | 18 |
| ACAV viscosity at 1 000 000 s$^{-1}$ (mPa · s) | 69 | 63 | 61 | 62 |

The invention claimed is:

1. A coating color for paper or cardboard, comprising expressed as % by weight of each of its constituents with respect to its total weight:
from 20% to 50% of water,
from 50% to 75% of at least one inorganic or organic material,
from 5% to 20% of a binder composed of at least one dextrin,
wherein the at least one dextrin exhibits an amylopectin content of greater than 95% and a weight-average molecular weight of more than 1,000,000 Da and less than 2,500,000 Da, and
from 0% to 5% of at least one additive chosen from a group of additives consisting of an optical brightener, a rheology modifier, a thickener, an antifoaming agent, a dispersant, a pH-regulating agent, a colorant, a lubricant, and a crosslinking agent.

2. The coating color as claimed in claim 1, wherein the binder is composed of at least 20% by dry weight of the at least one dextrin.

3. The coating color as claimed in claim 1, wherein the at least one dextrin exhibits the amylopectin content of greater than 98%.

4. A paper or cardboard, at least one of the faces of which has been coated using a coating color as claimed in claim 1.

5. The coating color as claimed in claim 1, wherein the binder is composed of at least 80% by dry weight of the at least one dextrin.

6. The coating color as claimed in claim 1, wherein the binder is composed of at least 99% by dry weight of the at least one dextrin.

7. The coating color as claimed in claim 1, wherein the at least one dextrin exhibits the amylopectin content of greater than 99%.

8. A coating color for paper or cardboard, wherein the coating color comprises, expressed as % by weight of each of its constituents with respect to its total weight:
from 28% to 50% of water,
from 50% to 64% of at least one inorganic or organic material,
from 8% to 12% of a binder composed of at least one dextrin, wherein the at least one dextrin exhibits an amylopectin content of greater than 95% and a weight-average molecular weight of more than 1,000,000 Da and less than 2,500,000 Da and from 0.1% to 2% of at least one additive.

9. A method of preparing the coating color for paper or cardboard according to claim 1, comprising incorporating into the coating color water, at least one inorganic or organic material, and a binder composed of at least one dextrin, wherein the at least one dextrin exhibits an amylopectin content of greater than 95% and a weight-average molecular weight of more than 1,000,000 Da and less than 2,500,000 Da.

10. The method as claimed in claim 9, wherein the binder is composed of at least 20 by dry weight of the at least one dextrin.

11. The method as claimed in claim 9, wherein the at least one dextrin exhibits the amylopectin content of greater than 98%.

12. A process for coating a paper or a cardboard by application, to at least one of the faces of said cardboard or of said paper, of a coating color as claimed in claim 1.

* * * * *